United States Patent
Berninger (10) Patent No.: US 7,331,094 B2
(45) Date of Patent: Feb. 19, 2008

(54) METHOD AND DEVICE FOR POSITIONING COMPONENTS TO BE JOINED TOGETHER

(75) Inventor: Alwin Berninger, Aystetten (DE)

(73) Assignee: KUKA Roboter GmbH, Augsburg (DE)

( * ) Notice: Subject to any disclaimer, the term of this patent is extended or adjusted under 35 U.S.C. 154(b) by 479 days.

(21) Appl. No.: 10/736,031

(22) Filed: Dec. 15, 2003

(65) Prior Publication Data

US 2004/0143951 A1    Jul. 29, 2004

(30) Foreign Application Priority Data

Dec. 16, 2002 (DE) ................................ 102 58 633

(51) Int. Cl.
*B23Q 17/00* (2006.01)
*B23Q 7/00* (2006.01)

(52) U.S. Cl. ............... 29/407.05; 29/407.1; 29/407.09; 29/464; 29/466; 29/468; 29/559; 29/281.5; 29/897.2; 269/9; 269/37; 269/45; 269/55; 901/1; 901/31

(58) Field of Classification Search ............. 29/407.05, 29/407.09, 407.1, 464, 466, 468, 559, 897.2, 29/721, 281.1, 281.5; 269/9, 37, 45, 55, 269/58; 901/1, 8, 31, 41
See application file for complete search history.

(56) References Cited

U.S. PATENT DOCUMENTS

| | | | | |
|---|---|---|---|---|
| 4,163,183 A | * | 7/1979 | Engelberger et al. | 318/568.13 |
| 4,239,431 A | * | 12/1980 | Davini | 414/1 |
| 4,275,986 A | * | 6/1981 | Engelberger et al. | 414/730 |
| 4,589,184 A | * | 5/1986 | Asano et al. | 29/430 |
| 4,589,199 A | * | 5/1986 | Ohtaki et al. | 29/714 |
| 4,655,676 A | * | 4/1987 | Jannborg et al. | 414/736 |
| 4,691,905 A | * | 9/1987 | Tamura et al. | 269/45 |
| 4,736,826 A | * | 4/1988 | White et al. | 191/12.2 A |

(Continued)

FOREIGN PATENT DOCUMENTS

DE         40 16 033 A1     11/1991

(Continued)

OTHER PUBLICATIONS

A Two-armed Intelligent Robot Assembles Mini Robots Automatically (Fanuc Ltd).

(Continued)

*Primary Examiner*—Essama Omgba
(74) *Attorney, Agent, or Firm*—McGlew and Tuttle, P.C.

(57) ABSTRACT

A device for positioning components to be joined together, such as car body components, is characterized by at least one movable central module and a plurality of arms, movable in space and connected thereto and which in each case have at least one holding element for holding the components. By means of the inventive method for the positioning of the components to be joined together and for the performance of which the said device is particularly suitable, the components are held from a position within a desired arrangement of the components to be joined. In this way the assembled components during a subsequent tacking together and optionally further downstream production processes such as welding or the like, are accessible in optimum manner from the outside. Further advantages of the method according to the invention are a limited space requirement and possible balancing of the production process.

29 Claims, 10 Drawing Sheets

U.S. PATENT DOCUMENTS

| | | | |
|---|---|---|---|
| 4,811,891 A * | 3/1989 | Yamaoka et al. | 228/182 |
| 4,821,408 A | 4/1989 | Speller, Sr. et al. | |
| 4,842,474 A * | 6/1989 | Torii et al. | 414/680 |
| 4,875,273 A * | 10/1989 | Yamamoto | 29/467 |
| 4,894,901 A * | 1/1990 | Soderberg | 29/428 |
| 4,928,386 A * | 5/1990 | Schupp et al. | 29/824 |
| 4,960,969 A * | 10/1990 | Shigenaka | 219/91.2 |
| 4,962,917 A * | 10/1990 | Tamura et al. | 269/56 |
| 5,265,317 A * | 11/1993 | Angel | 29/429 |
| 5,272,805 A | 12/1993 | Akeel et al. | |
| 5,438,647 A * | 8/1995 | Nagamatsu et al. | 700/247 |
| 5,930,460 A * | 7/1999 | Noumaru et al. | 700/245 |
| 6,061,890 A * | 5/2000 | Shashlo et al. | 29/434 |
| 6,378,186 B1 * | 4/2002 | Angel | 29/281.1 |
| 6,389,698 B1 * | 5/2002 | Malatier | 29/897.2 |
| 6,438,842 B1 * | 8/2002 | Raami | 29/897.2 |
| 6,493,930 B1 * | 12/2002 | Raami | 29/783 |
| 6,505,870 B1 * | 1/2003 | Laliberte et al. | 294/106 |
| 6,592,324 B2 * | 7/2003 | Downs et al. | 414/741 |
| 6,640,458 B2 * | 11/2003 | Sawdon | 33/502 |
| 6,669,257 B2 * | 12/2003 | Laliberte et al. | 294/106 |
| 6,698,737 B1 * | 3/2004 | Blessing | 269/55 |
| 6,851,166 B1 * | 2/2005 | Demit et al. | 29/281.5 |
| 6,899,377 B2 * | 5/2005 | Ghuman et al. | 296/181.1 |
| 6,913,627 B2 * | 7/2005 | Matsuda | 623/64 |
| 6,935,550 B2 * | 8/2005 | Caldarone et al. | 228/49.2 |
| 7,036,210 B2 * | 5/2006 | Jung | 29/714 |
| 7,077,619 B2 * | 7/2006 | Corrigan | 414/744.4 |
| 7,100,271 B2 * | 9/2006 | Baulier | 29/711 |
| 2002/0138962 A1 | 10/2002 | Flaga et al. | |

FOREIGN PATENT DOCUMENTS

| | | |
|---|---|---|
| DE | 42 90 927 C2 | 1/1994 |
| EP | 216710 A1 * | 4/1987 |
| EP | 441397 A1 * | 8/1991 |
| EP | 0 464 004 A1 | 1/1992 |
| GB | 2 221 659 A | 2/1990 |
| GB | 2 327 913 A | 2/1999 |
| JP | 59053275 A * | 3/1984 |
| JP | 63074547 A * | 4/1988 |
| JP | 08155756 A * | 6/1996 |
| JP | 11179682 A * | 7/1999 |
| JP | 11267838 | 10/1999 |
| JP | 2001054889 A * | 2/2001 |

OTHER PUBLICATIONS

Development of Multi-Arm Robots for Automobile Assembly (Toyota Motor Corporation).

* cited by examiner

METHOD AND DEVICE FOR POSITIONING COMPONENTS TO BE JOINED TOGETHER

FIELD OF THE INVENTION

The invention relates to a method and to a device for positioning components which are to be joined together, such as body components for the manufacture of a body shell in the automotive industry.

BACKGROUND OF THE INVENTION

Such methods and devices are known and are regularly used in the automotive industry during the welding together of the body from various partial components. Thus, the manufacture of a body shell takes place roughly in the following way. The partial components of a vehicle, such as the underbody, mounted parts and the like, are prefabricated in plants individually set up for this purpose. This is followed by the joining together of the complete body within a manufacturing assembly position or "Geo-Station". Following production line processes such as welding, lasing, bonding, riveting, etc. ensure an adequate body rigidity.

The "Geo-Station" has devices designed for ensuring the geometry of the joined overall body. Initially specific partial components of the body are brought into the desired positions and then tacked within the "Geo-Station" by means of stationary clamping devices, such as movable/rotary clamping devices or NC-controlled clamping stations (cf. table 1). Then, further partial components such as underbody components are positioned within the "Geo-Station" by numerically controlled clamping stations. Further partial components, such as side parts, are supplied to the "Geo-Station" by individual, mobile clamping frames or pallets (table 1), in which the corresponding partial components are held and which are suitably timed in within the working process. Following the fastening together of the components to form the overall body the grippers located on the clamping frames or pallets are opened and said frames or pallets, following the passing through of the "Geo-Station" are separated from the body and again supplied to the production sequence.

In another variant for the positioning of the components to be joined together, they are arranged around a stationary clamping island (cf. table) having a fixed geometry and are held in position by the latter during tacking.

The known methods and apparatuses for positioning components to be joined together have, as a result of their very principle, a number of disadvantages shown in summary form in table 1 (source: Agiplan, Automobil Industrie Spezial Fabrikautomation, vol. 47, April 2002). Thus, stationary clamping devices only have a limited model flexibility and are unsuitable for multi-geometries. Numerically controlled clamping stations suffer from disadvantages with regards to plant availability and process security. Type-related clamping pallets only make possible a limited accessibility with respect to the assembly position and suffer from high operating costs. Type-related clamping islands are only suitable to a limited extent for multi-geometries, have high operating costs and are characterized by high space consumption.

TABLE 1

|  | Movable/rotary clamping device | NC-controlled clamping stations | Type-related clamping pallet | Type-related clamping island |
| --- | --- | --- | --- | --- |
| Clamping procedure | stationary | stationary | mobile | mobile |
| Horizontal model flexibility (different vehicle sizes) | − | 0 | + | + |
| Vertical model flexibility (different model variants) | − | + | + | + |
| Assembly position accessibility | 0 | 0 | 0 | + |
| Multi-geometries | − | 0 | + | 0 |
| Plant availability | 0 | − | + | + |
| Process security | 0 | − | + | + |
| Surface consumption | + | + | + | − |
| Capital expenditure | 0 | + | + | 0 |
| Operating costs | 0 | + | 0 | 0 |
| Clamping joining position standardization | 0 | + | + | + |
| Offline programmability | − | + | − | − |

The problem of the invention is to overcome the prior art disadvantages resulting from the principle and provide a new production technology route, which is in particular characterized by high model flexibility, space saving, good accessibility and an accelerated production sequence.

SUMMARY OF THE INVENTION

In the case of a method of the aforementioned type, this problem is solved in that the components are held from a position within a desired arrangement of the components to be joined by at least one central module with a plurality of articulated arms (clamping device). In the case of a device of the aforementioned type, the set problem is solved in that the latter has a movable central module and a plurality of space-movable, articulated arms connected thereto and which in each case have at least one holding element for holding the components.

The term central module implies that it is a module which for holding the components to be joined is positioned centrally within the component joining arrangement held by said central module and consequently the components to be joined surround said central module.

In this way, as a result of the use of the method or device according to the invention a high model flexibility, e.g. for adapting to demand variations or for the integration of niche models can be achieved. Through the omission of type-specific clamping means, devices or large-volume, numerically controlled clamping spindles the inventive device gives rise to significant space saving. There is also no longer a need for a complicated measuring or pairing of individual clamping frames in order to provide a true-to-size clamping box. The complicated search for fault or error sources, e.g. for clamping frames falling outside the allowed tolerance is rendered superfluous. In place of in each case four clamping frames per body (side parts, underbody, roof) preferably only a single device is required for clamping the body parts and which also, due to its arrangement within the body, permits good accessibility from the outside to the joining process points. Through the holding of the components from a position within the body structure, there is also no need for additional coverings to protect prepainted metal sheets.

It is also possible for a plurality of arms to in each case have at least one tool for the connection of the joined components. In this way the invention creates a device, which in integral form is suitable both for assembling and connecting components, e.g. by welding, clinching, bonding or the like and consequently renders at least partly unnecessary the subsequent use of further handling equipment. Preferably the tacking together then takes place through the actual clamping device using suitable tools. This saves time, space and costs. Suitable tools can be any such tools used in body shell construction such as those used for spot welding (tongs), fusion welding, laser welding, friction welding, stud welding, riveting, clinching and bonding.

According to a further development of the method according to the invention, the clamping device waits in a first rest position with folded in arms and/or arms applied to the central module at a predetermined inoperative position and then the components to be joined are at least roughly joined together using further suitable handling devices such as industrial robots, the clamping device being located in an area within the components to be assembled and that then by suitable positioning of the arms in space the components are clamped. The clamping device is placed, according to the invention, directly on a base part of the component structure and for this purpose has studs, pins or other suitably constructed supporting devices. Alternatively or additionally for relieving the base, e.g. the body base, it is possible for the clamping device to be supported on a conveyor element carrying the components, such as a frame element. In the latter case the inventive clamping device preferably has suitably constructed support devices in the form of articulated and/or telescopic arms.

It is also possible in the method according to the invention to carry out prior to a meeting of the components position measurements on the parts to be joined and if position deviations are detected to perform active position corrections by the clamping device. Preferably position measured values are buffer stored and following the detection of a deviation trend are used for correcting a control program for the clamping device and/or for messages to a quality assurance unit. Thus, a device according to the invention is preferably provided on the arms with sensors for recording measured position values for the components and in a further development a storage unit for the buffer storage of position values, such as a volatile memory or a bulk memory. In addition to a position measurement, it is also possible to carry out and store force measurements and/or material tests, e.g. at connection points.

According to a preferred development of the method according to the invention, following a subsequent tacking together or further downstream production processes such as welding or the like, the clamping device automatically moves out of the space within the components. Alternatively and according to a further development of the inventive method, it is possible that after a subsequent tacking together or further downstream production processes such as welding or the like, for the clamping device to be moved by a further handling device such as an industrial robot from the space within the components. Particularly within the framework of the first of these two alternatives it is possible for the inventive device to "ride along" with the body shell the joining together of the latter, so that in this way it is possible to change from timed production to continuous production. This makes it possible to compensate the individual process steps from one to several working positions and this also leads to a desirable widening of the previous "Geo-Station" bottleneck.

According to further developments of the method of the invention, in accordance with a control unit the arms are positioned synchronously in space. Alternatively or additionally the arms can be positioned asynchronously in space in accordance with a control unit. According to a preferred development of the inventive method, the movements of the arms take place in at least three degrees of freedom. It is therefore possible within continuous production to successively join together components and also to reliably clamp complex geometries.

The articulated arms of the device according to the invention are preferably constructed for movements with in each case at least three degrees of freedom.

According to a preferred development of the device according to the invention, it can be brought into a space within a desired arrangement of the components to be assembled and following subsequent tacking together of the components or further downstream production processes can be removed therefrom again. Thus, the inventive device is preferably constructed in such a way that the arms can be folded in and/or can be applied to the central module. Thus, following the tacking together of the finished body shell, a particularly easy removal of the inventive device from the space within the assembled components is ensured. This can fundamentally take place using aids independent of the device, such as by hand, by a robot, crane, slide, carriage or similar means. In preferred developments it is constructed for independent moving into a space within the components to be assembled and/or is constructed for automatically moving out of the space within the components to be assembled. This means that the device can be automatically moved without outside assistance up to its working location and can then be moved out of the same again after assembling the parts.

Further developments of the device according to the invention provides for it to have a computer-based control unit. Within the framework of such a design, the inventive device is to be looked upon as a clamping robot and as a result of the program-controlled, flexible usability of a robot has a corresponding high model flexibility and also a rapid model change is possible as a result of the fact that it is merely necessary to carry out a program change (software change), optionally associated with a software-controllable or manual replacement of the holding elements and/or tools instead, as hitherto, requiring a complete hardware change and for this purpose the inventive device preferably has appropriate changeover clutches. This also makes it possible to reduce the time for developing a new model (with a new model geometry) up to the production sequence due to the given offline programmability.

According to further developments of the device according to the invention, the arms have means for media supply to the clamping elements and/or the tools and the central module preferably has means for the media supply for the arms. In a highly preferred development of the inventive device, the central module has a power supply unit. The power supply unit can in particular have an autarchic construction, so that together with an autarchic media supply of the inventive device, it is ensured that the latter can move independently and flexibly within the framework of the production process between different working positions which, as stated hereinbefore, leads to an extensive balancing of the process steps and consequently contributes to a more economic process design.

In order to also be usable within the framework of applications requiring high holding or retaining forces when joining the components together, such as in the automotive industry, according to a preferred development of the inventive device the arms are constructed for making available high static holding forces of up to 3000 N. As is known, such measures involve the use of torsion-resistant and twisting-resistant structural elements, the use of high rigidity transmissions or gears in joints and the use of additional or correspondingly dimensioned blocking brakes.

In order to permit particularly flexible use within the framework of the method according to the invention, it is preferable from the control standpoint for each arm to have its own control or tool-relevant point (TCP). The TCP constitutes the actual action point at the end of a robot arm or the tool fitted thereto. This point, which can be located both inside and outside mechanical parts (e.g. with opened welding tongs the virtual point of electrode contact, with laser tools the focus or with inert gas welding torches the arc location) is programmed into the control, managed and reproduced on starting a program. All other points of the robot arm or the complete structure are not known to the control. Thus, from the control standpoint, the device according to the invention behaves like a multiarm, multi-axis robot and in this way opens new production procedure routes, particularly for the assembly of bodies in the automotive industry.

BRIEF DESCRIPTION OF THE DRAWINGS

Further advantages and characteristics of the invention can be gathered from the following description of embodiments and the attached drawings, wherein show.

DETAILED DESCRIPTION OF THE DRAWINGS

FIGS. 1a to 1d diagrammatically show a device 1 according to the invention for the positioning of components such as side parts 2.1, base parts 2.2 and the roof 2.3 for a car body 2 and on the basis of two different examples (two vehicle types of different sizes).

The inventive device 1 has a central module 1.1 and, connected thereto, a plurality of arms 1.2, which are movable in space and in the form of articulated arms, which at their distal end have in each case a holding element 1.3 for clamping the components 2.1, 2.2, 2.3. The device 1 is supported by means of lower articulated arms 1.2' directly on the base 2.2 of the body shell 2. In the embodiment of FIGS. 1a to 1d, the central module 1.1 also has a transmitting/receiving unit 1.4 for transmitting and receiving measurement and control signals or electromagnetic power. It also has sensors 1.5, such as ultrasonic or other sensors, for determining measured position values for the components 2.1, 2.2, 2.3 to be joined or assembled.

Figure 5:
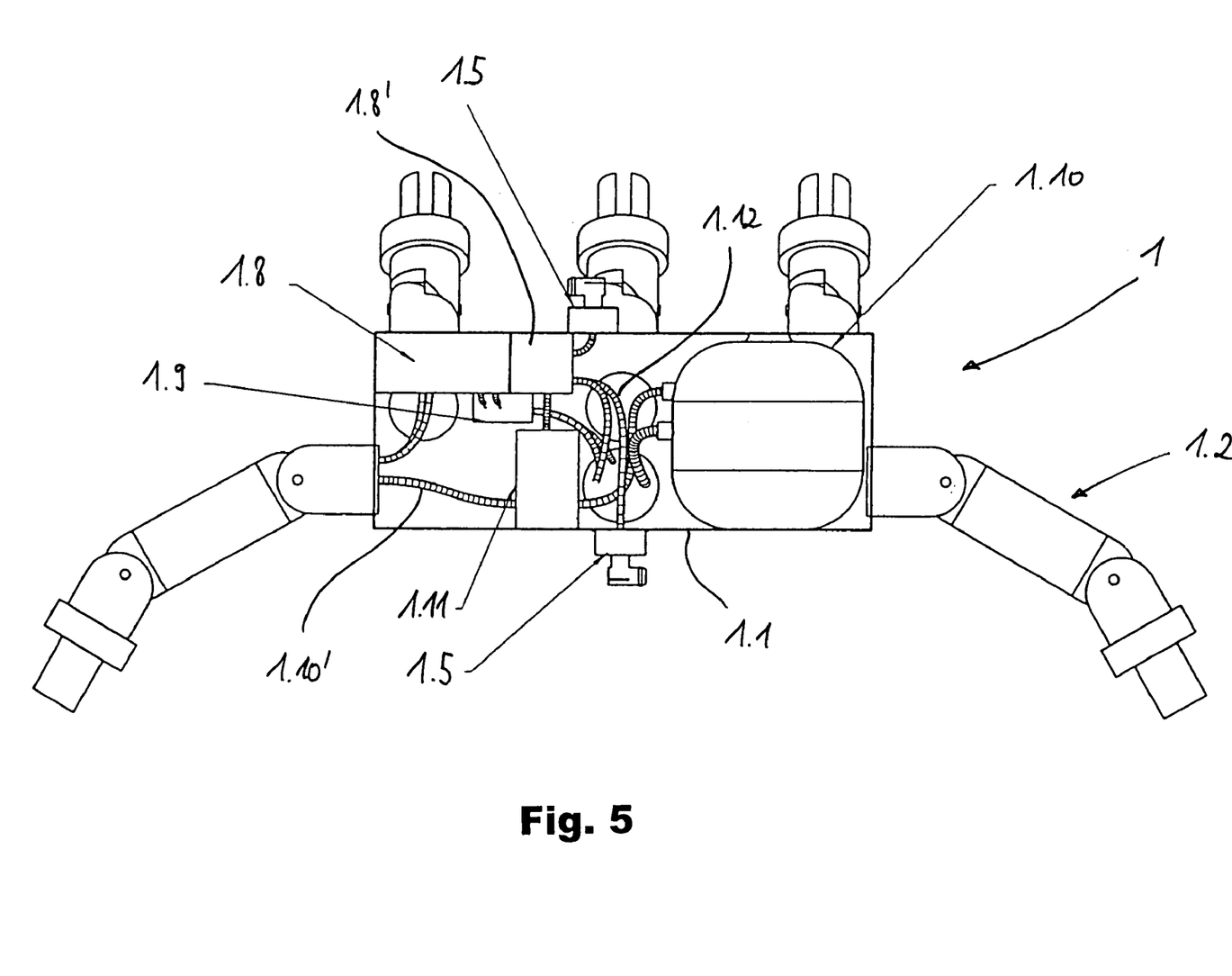
FIG. 5 A diagrammatic sectional representation of an inventive clamping robot in articulated arm technology for (temporarily) autarchic operation intimating an only temporarily connected power supply.

The arms 1.2, 1.2' of the inventive devices 1 shown in FIGS. 1a to 1d have in each case a plurality of connecting rods 1.6, which are articulated to one another and to the central module 1.1 by joints 1.7. The arms 1.2, 1.2' are in each case movable in space with at least three and up to six degrees of freedom, so that the device 1 according to the invention can be looked upon as a multiarm, mobile clamping robot. Thus, based on an internal or external, computer-based control unit (1.8; FIGS. 5/6), it is possible with the same device 1 to assemble or clamp widely differing body geometries and it is only necessary for a minimum hardware adaptation, as can be gathered by comparing FIGS. 1a, b on the one hand and FIGS. 1c, d on the other.

Figures 1A, 1B:
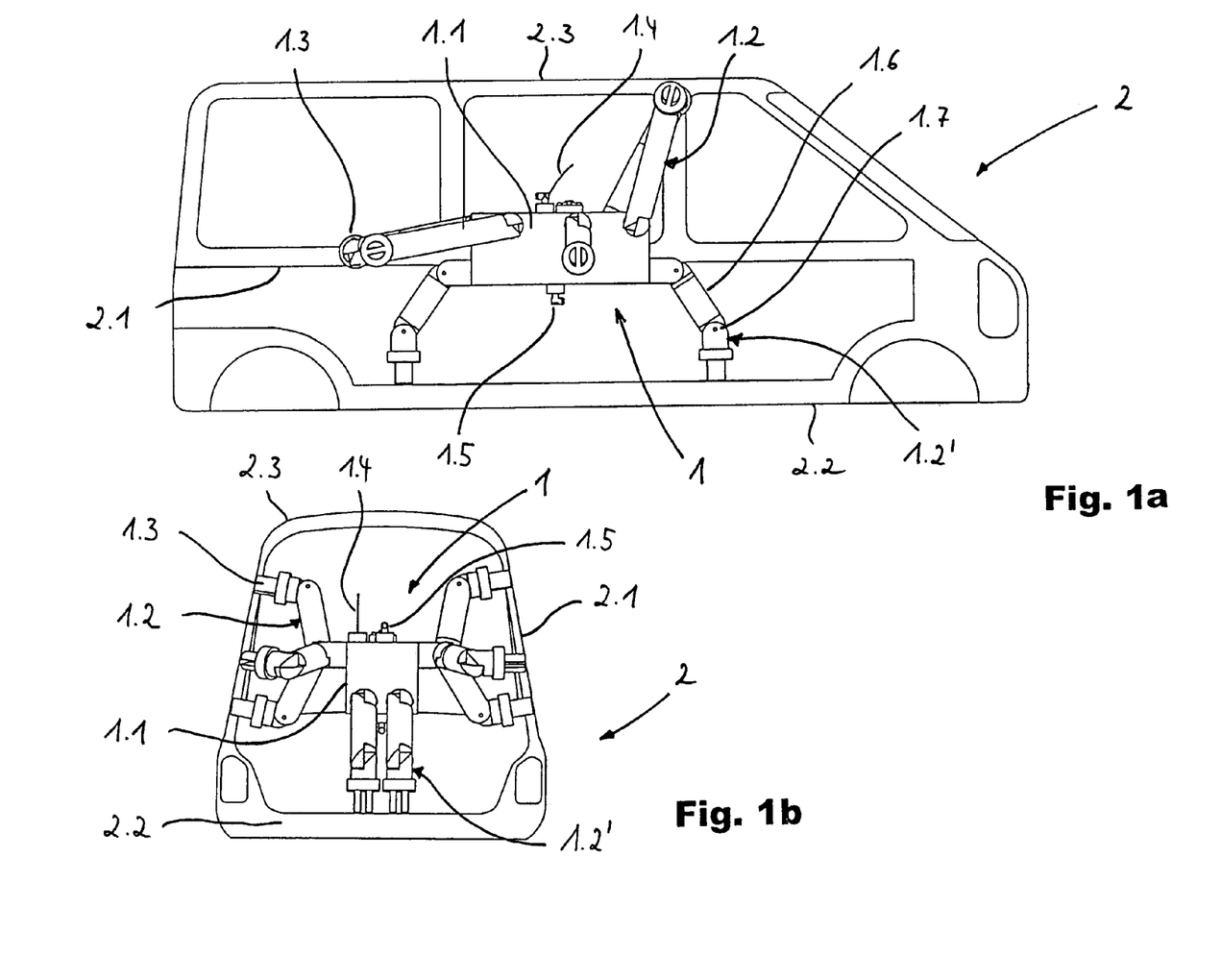
FIGS. 1a to 1d Diagrammatic representations of a first construction of the inventive device for the positioning of car body parts.
Figure 1C:
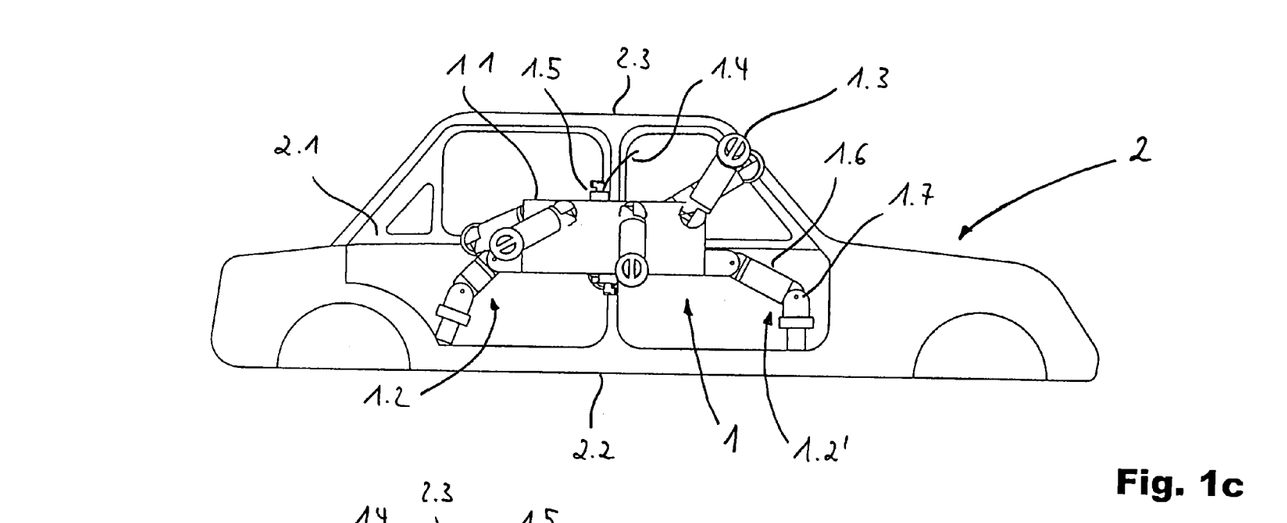
Figure 1D:
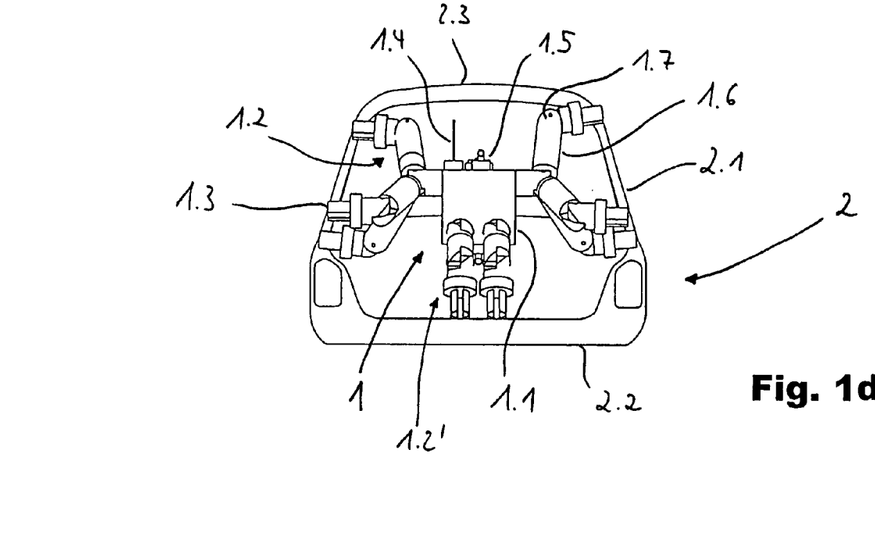
Figure 2A:
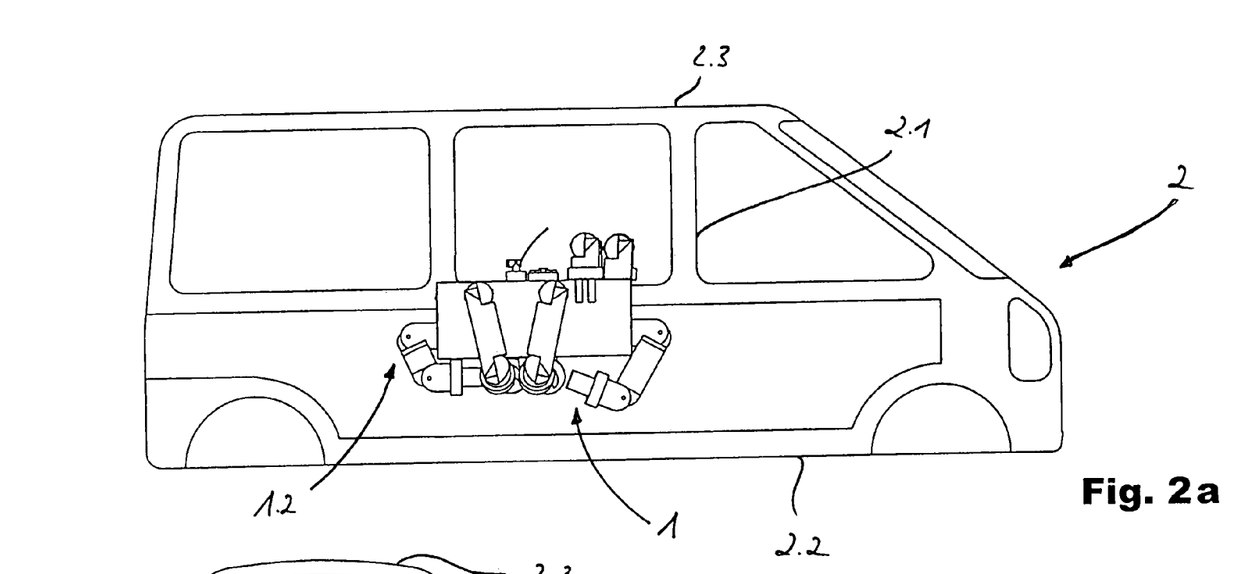
FIGS. 2a and 2b Two diagrammatic representations of a car body and a clamping robot with folded in and applied arms for introduction in or removal from the body.
Figure 2B:
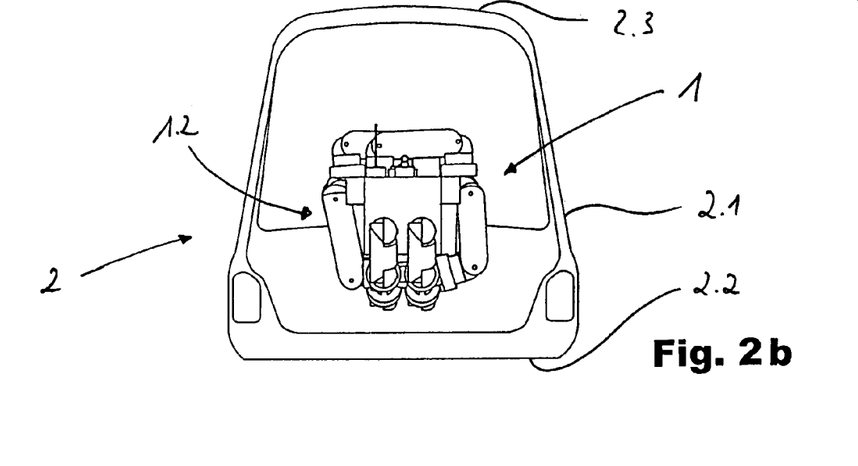

Following the tacking together of the body components 2.1, 2.2, 2.3 by a not shown tool located on the arms 1.2 and/or by external tools, the inventive device 1 can easily be removed from the interior of the body 2 by folding in or applying arms 1.2 according to FIGS. 2a, 2b, e.g. through a further, not shown handling device such as an industrial robot. However, it is also possible to construct the inventive device 1 in such a way that (after folding in or applying the arms 1.2) it can be independently removed from the body 1.2. The initial positioning of the body components 2.1, 2.2, 2.3 takes place either completely from the outside using suitable handling devices such as industrial robots, the inventive device preferably being brought independently or by a further handling device into the resulting inner space of the body 2 or the inventive device can be in a waiting position, so that the body 2 is quasi "built round" said device 1. It is possible to supply the body components 2.1, 2.2, 2.3 through external handling devices solely up to a "preliminary position" where they are actively taken over and finally positioned by the device according to the invention.

In the embodiment of FIGS. 1a to 1d, the device 1 is initially placed on the body base 2.2 and, as stated, following the tacking together of the body 2 with applied arms 1.2 is removed again from the outside, e.g. through the opening for the windscreen, or passes out of the finished body shell 2 by self-movement. The following alternative or combined possibilities exist for the support or fixing of the clamping robot 1 in the body shell 2:

It is possible to provide on the base of the clamping robot 1 pins, studs or gripping devices 1.16 (FIG. 10) for connection to the body base 2.2. According to FIGS. 1 to 3 connection to the body base can also take place using articulated arms 1.2'. In the embodiment of FIGS. 4a and 4b, the clamping robot 1 according to the invention is supported by means of specifically constructed lower articulated/telescopic arms 1.2' on a conveyor carrying the body 2, such as a frame element 5 or some other part of a not shown conveyor. This relieves the body base, so that there is no need for underfilling or additional supporting thereof.

According to the invention, the gripping and holding of the components 2.1, 2.2, 2.3 through at least one inventive clamping device 1 (clamping robot) takes place from the inside, i.e. from a position within a desired arrangement of the components to be joined, which ensures optimum accessibility from the outside, which is associated with minimum space requirement resulting from the components 2.1, 2.2, 2.3 to be joined and no additional protective measures are needed for prepainted components. Particularly in the case of large bodies and the need for numerous clamping points, it is possible to use several clamping robots according to the invention.

The clamping robot 1 according to the invention can, in addition to the holding and fixing of supplied parts, also actively position the same, optionally under the control of sensors 1.5. Thus, the process is possible with sequential, partial assembly processes and intermediate or subsequent measuring processes. Thus, e.g. following the setting of the first connection points critical positions can be measured again and, if necessary, position corrections can be brought about by means of the clamping robot. The measurements can be performed by internal sensor means 1.5 (on the clamping robot body or on the arms) or external sensor means (independently of the clamping robot, outside the body; not shown). This corresponds to an early, process-near quality control.

Figures 3A, 3B:
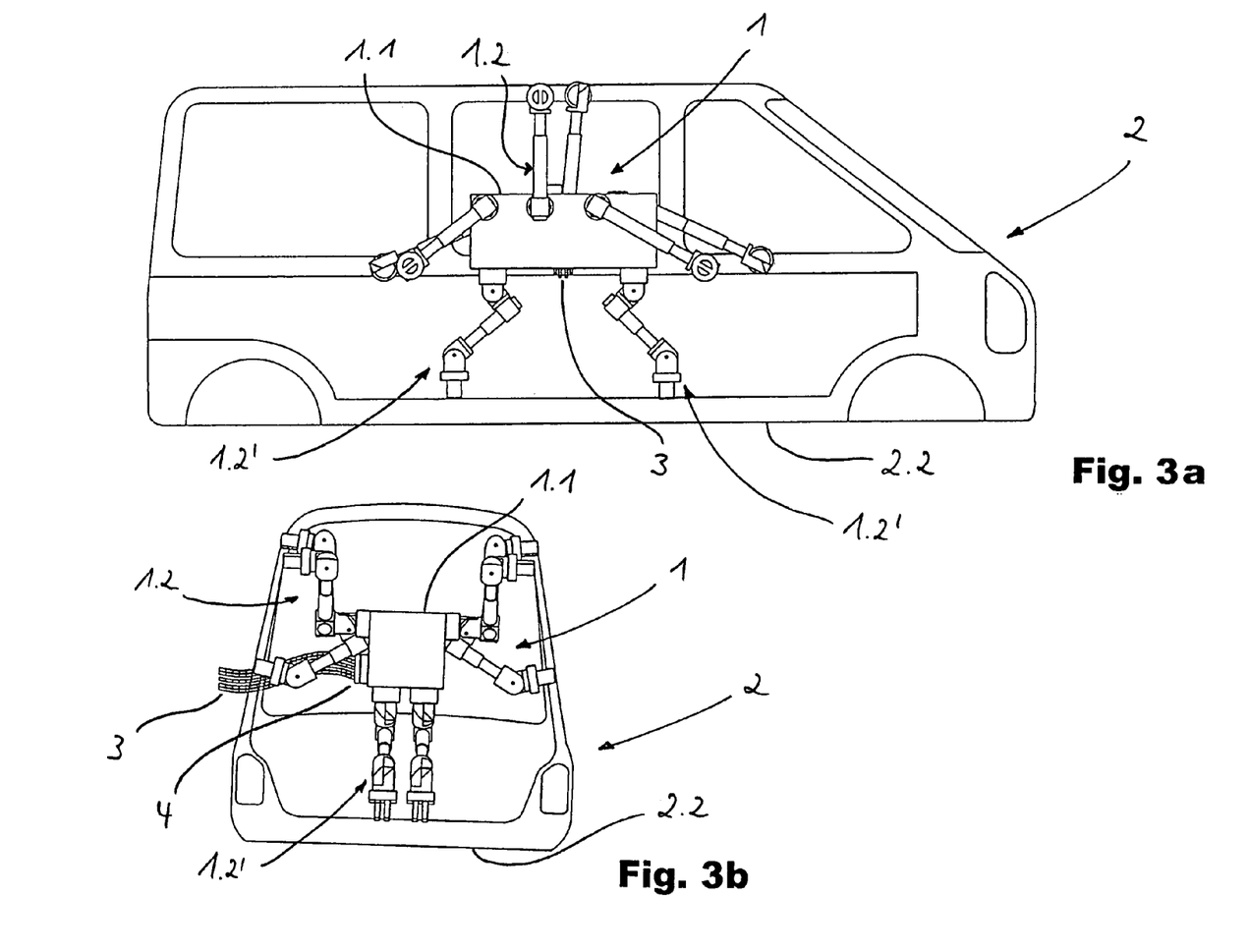
FIGS. 3a and 3b Diagrammatic representations of a second embodiment of the inventive clamping device with articulated/telescopic arms.
Figure 4A:
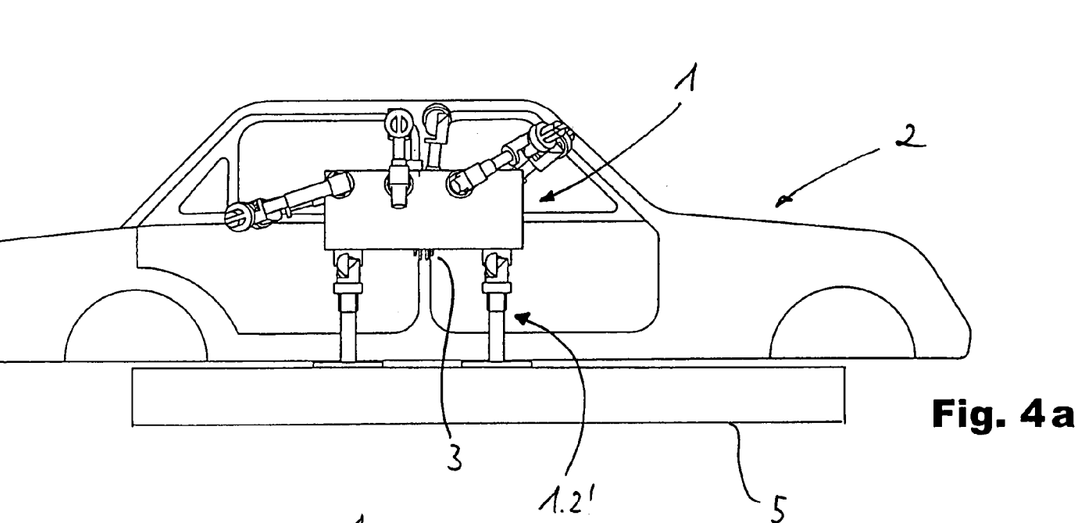
FIGS. 4a and 4b Diagrammatic representations of a further embodiment of the inventive device supported on a conveyor element within the body.
Figure 4B:
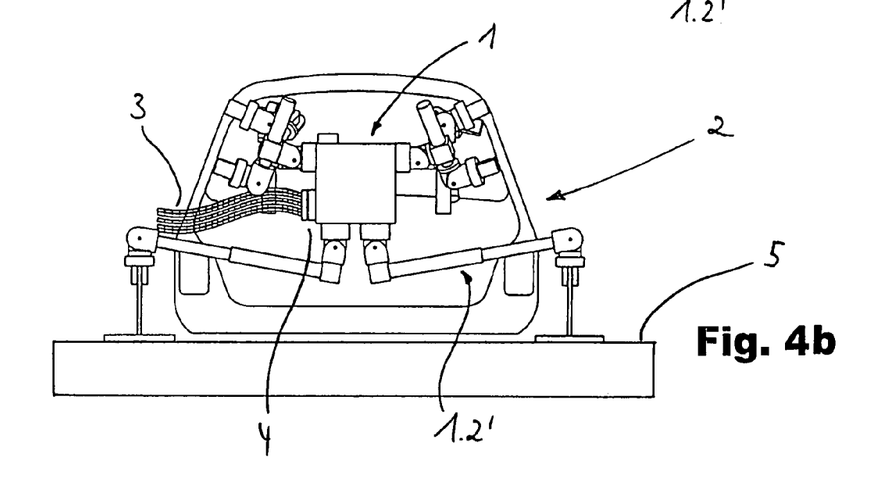

FIGS. 3a and 3b show the inventive clamping robot 1 in a design with articulated/telescopic arms 1.2, 1.2', which have at their ends not shown tools or holding elements 1.3 for clamping or assembling body parts 2.1, 2.2, 2.3. As in the embodiments of the preceding drawings, the clamping robot 1 is supported directly by means of lower arms 1.2' on the body base 2.2. Unlike in the embodiments of FIGS. 1a-d and 2a,b, the power supply and data transmission takes place by means of a cable arrangement 3, which can be connected by a connecting element 4 in a separable or permanent manner to the central unit 1.1 of the clamping robot 1.

FIGS. 1a to 4b relate to the use of an inventive device 1 for positioning components 2.1, 2.2, 2.3 of a car body 2. During continuous production, such as is possible through the use of the method or device according to the invention, there is no need for all the body components to be assembled to be in the working position at a specific, common time, which resulted in conventional automotive industry body manufacture to the occurrence of a bottleneck at the "Geo-Station". According to the invention it is also possible to tack together the body 2 with the exception of a few components 2.3, e.g. the roof and then to remove the inventive device through a remaining opening, e.g. through the roof and then to complete the assembly of the body shell 2 in a final operating step.

This novel procedure in positioning components to be assembled, such as car body components, avoids the disadvantages resulting from the very principle of existing manufacturing concepts. This applies to a particular degree to the avoidance of the bottleneck resulting from the transition to continuous production and which resulted from the stoppage necessary in previous manufacturing procedures.

The following variants are possible individually or in combination with regards to the control intelligence installed in the inventive clamping robot 1 and the nature of the power supply and data transmission.

The clamping robot can be equipped without its own or with a minimum installed intelligence, i.e. it only contains the operating means (joint drives, gripper drives, optionally tool drives) and the associated power electronics. The entire control intelligence is located outside the clamping robot. This requires either a permanent data connection to the control or at least a temporary data connection during the actual clamping phase. The former is necessary if during the assembly process active measurement and reaction are required. As from this time and without active processes, the data connection can be ended. A separation of the power supply is possible through incorporated electric power storage devices and optionally accumulators for the pressure medium (in the case of pneumatic or hydraulic operating means). In this case the operating means maintain the positions previously moved up to by the control.

Figure 6:
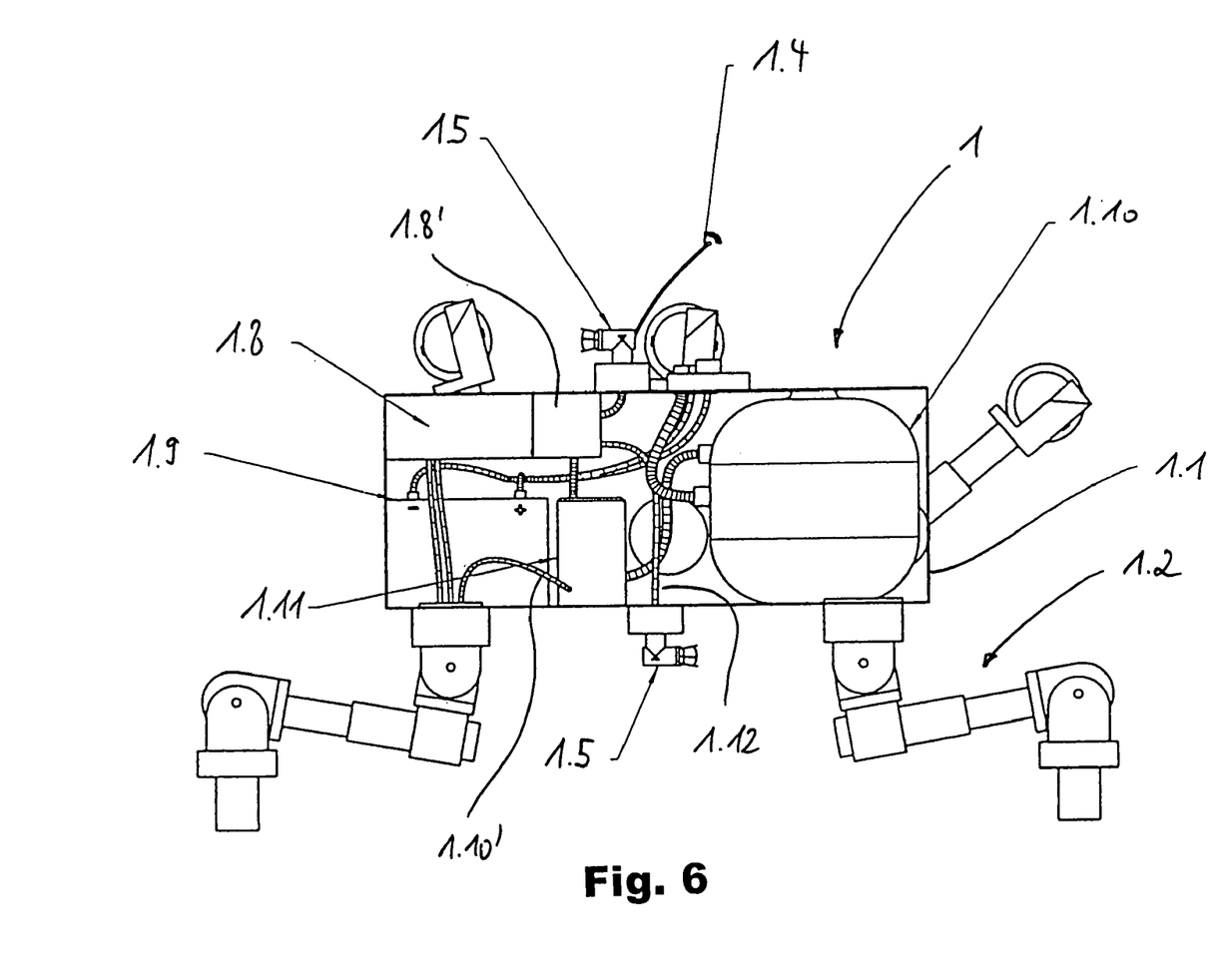
FIG. 6 A sectional representation of an inventive clamping robot in articulated/telescopic arm technology for (temporarily) autarchic operation.

Corresponding embodiments of the device according to the invention are shown in FIGS. 5 and 6. According to FIGS. 5 and 6, the clamping robot 1 according to the invention is preferably equipped with an independent control. In this case the control functions are largely or entirely implemented in the clamping robot 1. FIG. 5 is a section through the central unit 1.1 of an embodiment of the inventive clamping robot 1, which is only temporarily connected to an external power supply 3, 4 (cf. FIGS. 3b and 4b).

The central module 1.1 of the clamping robot 1 is provided for this purpose with a control unit 1.8, e.g. a PC control unit with a memory unit 1.8', such as a volatile or bulk memory, an electric power storage device 1.9, e.g. in the form of a battery, devices for media supply to the arms 1.2, 1.2' of existing pneumatic or hydraulic operating means (not shown), e.g. with compressed air or cooling water in the form of a pressure accumulator 1.10 and supply hoses 1.10' connected thereto, as well as a valve control 1.11 for the pneumatic or hydraulic system of the device connected to the control unit 1.8.

The electric power storage device 1.9 is at least temporarily connectable to an external electric power supply by means of the connection unit 4 shown in FIGS. 3b and 4b. The power stored in the power storage device 1.9 is then available for an at least temporary autarchic supply of the controls 1.8, 1.11 for the articulated movement and adjustment of the arms 1.2 and therefore for the clamping of the inventive device within a body shell 2. The sensors 1.5 connected by cables 1.12 to the control unit 1.8, following suitable processing of the position signals supplied by them by the control unit 1.8, permit an active positioning through the inventive clamping robot 1, e.g. the performance of position corrections. The PC-based control unit 1.8 has offline programmability, which leads to a reduction of the time necessary for development up to the start of production. According to the invention, from the software standpoint the control unit 1.8 can be set up for the detection of a deviation trend, so that on the basis of the position signals a correction of the control program taking place in the control unit is possible. Additionally or alternatively it is also possible to transmit messages to a not shown, preferably externally positioned unit for quality assurance, such as an optical or acoustic warning device or a software log.

According to the embodiment shown in FIG. 6, the inventive clamping robot 1 has, in addition to the embodiment of FIG. 5, a transmitting/receiving unit 1.4 in the form of an antenna permitting the reception of electromagnetic power from an externally located power source. Thus, the clamping robot 1 according to the invention is able to supply power without the cable arrangement 3 shown in FIGS. 3b, 4b and 5, which additionally extends the range of use of the device. In its construction with an autarchic power supply unit 1.9 (FIG. 6), the inventive device does not have a fixed working position and can be used virtually in a random position during the spatial process sequence, so that there is a possibility of continuous production with a simultaneous balancing of the process steps, i.e. all the parts are at all times in a linear movement with a speed higher than zero. With such designs a data connection to the outside is only temporarily necessary in order to receive data for the next body to be processed from an external master computer and to transfer to the same any test data obtained. It is possible to temporarily disconnect the power supply if the installed power storage device has an adequate capacity.

Thus, in principle, the clamping robot 1 according to the invention can be supplied with power in the following way:

According to FIG. 5 the clamping robot 1 has a cable an optionally also a hose connection 3 to the outside for the supply of electric power and a pressure medium (cf. FIG. 4b). The connecting cable arrangement 3 must be sufficiently long to cover the "ride-along"-distance of the clamping robot 1 in the body shell 2. There are also limitations with regards to the clamping robot movement. Alternatively a temporary cable and optionally hose connection to the outside is possible and the connection only exists during waiting for the next body or during the initial clamping phase with a high power requirement and can at any time be interrupted by the removal of the connection element 4. As a result of the limited connection time the joint travel distance and therefore cable length are reduced. Subsequently the clamping robot 1 is freely movable. During the separate connection or in the case of a clamping robot which, according to FIG. 6, has no hose or cable connection, in said robot 1 the necessary power must be provided by installed electric power storage devices (batteries, accumulators, fuel cells, etc.; 1.9, FIG. 6) and an accumulator 1.10 for optionally necessary pressure medium (gas, hydraulic fluid). If, at the end of the clamping cycle, the clamping robot 1 is released from the body 2, the connection can be restored and the power storage devices 1.9 can be regenerated for the next cycle or cycles. In the embodiment of FIG. 6 the clamping robot 1 receives its power in the form of electromagnetic radiation, which it receives with the aid of the transmitting/receiving unit 1.4.

The following alternative designs are possible for data transmission from the clamping robot 1 to optionally present, external control devices:

In the case of a permanent cable connection (FIGS. 3b, 4b, 5) a wired data transmission is possible, whilst for temporarily disconnected cable connections it is possible to use wireless transmission mechanisms, such as inductive, infrared or radiotransmission mechanisms (FIG. 6).

If there is no data exchange during the separated phase, there is no need for the indicated data transmission means.

Figure 7:
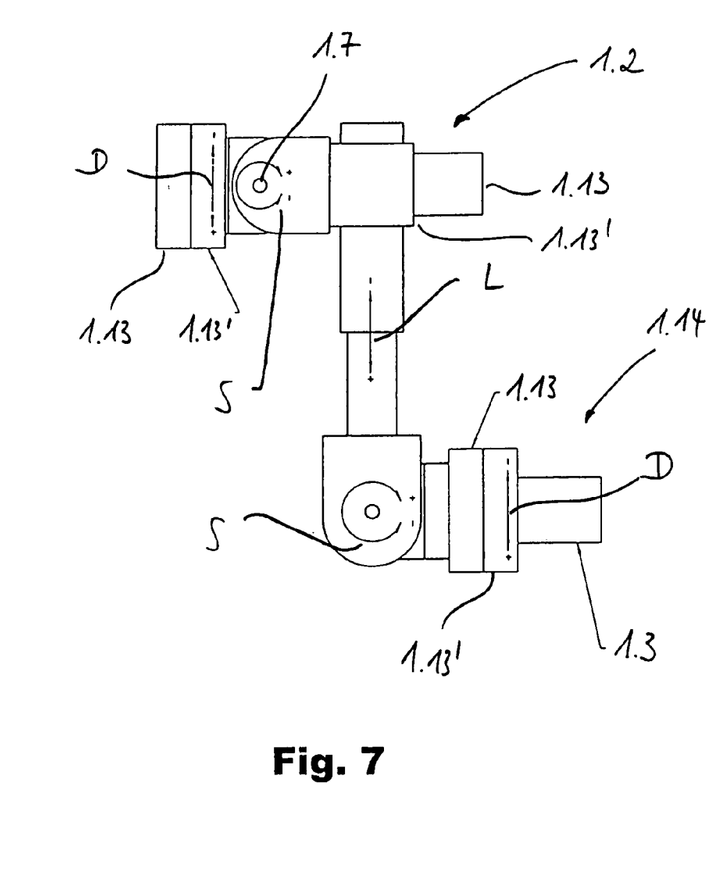
FIG. 7 A diagrammatic representation of an articulated/telescopic arm for an inventive clamping robot.

FIG. 7 is a larger scale, diagrammatic representation of an articulated, telescopic arm 1.2, as used in an inventive device 1 according to FIGS. 3a,b, 4a,b and 6. Such an articulated/telescopic arm 1.2 has a plurality of motor-gear arrangements, e.g. of a pneumatic or hydraulic nature, with in each case a motor 1.13 and a gear 1.131, which as a function of the construction and arrangement within the arm 1.2 are constructed for performing rotary D, linear L or pivoting S movements. According to the invention, at the distal end 1.14 of arm 1.2 is provided a holding element 1.3 in the form of a gripper, coupling, magnet or the like. Alternatively at this point the arm 1.2 can have a not shown tool for stud welding, adhesive application, clinching, etc. By its other end the arm 1.2 is fixed to the central module 1.1 of the device in an articulated manner.

Preferably, into the arm 1.2 is additionally integrated a suitable sensor system comprising force or moment sensors or the like. The articulated/telescopic arm 1.2 according to FIG. 7 is constructed for movements with a total of five degrees of freedom.

Figure 8:
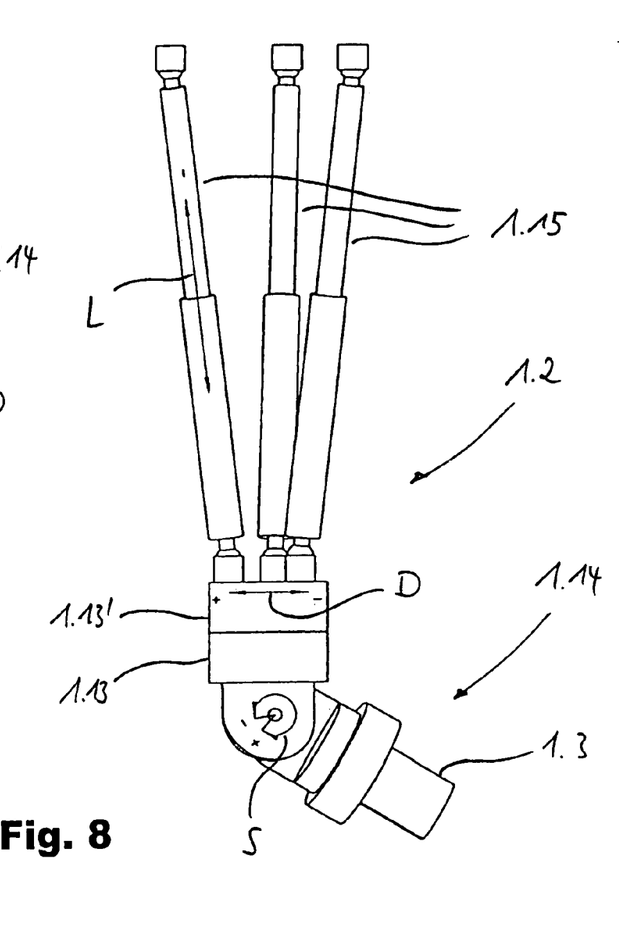
FIG. 8 A diagrammatic representation of a tripod arm for an inventive clamping robot.

FIG. 8 shows an alternative design of an arm 1.2 of the inventive device 1. The arm 1.2 according to FIG. 8 is constructed as a tripod arm, in which the positioning of a tool centre point (TCP) associated with the tool or holding element 1.3 located at the distal end 1.14 of the arm 1.2 takes place by a differing length change L of three linear elements (telescopic elements) 1.15.

Figure 9:
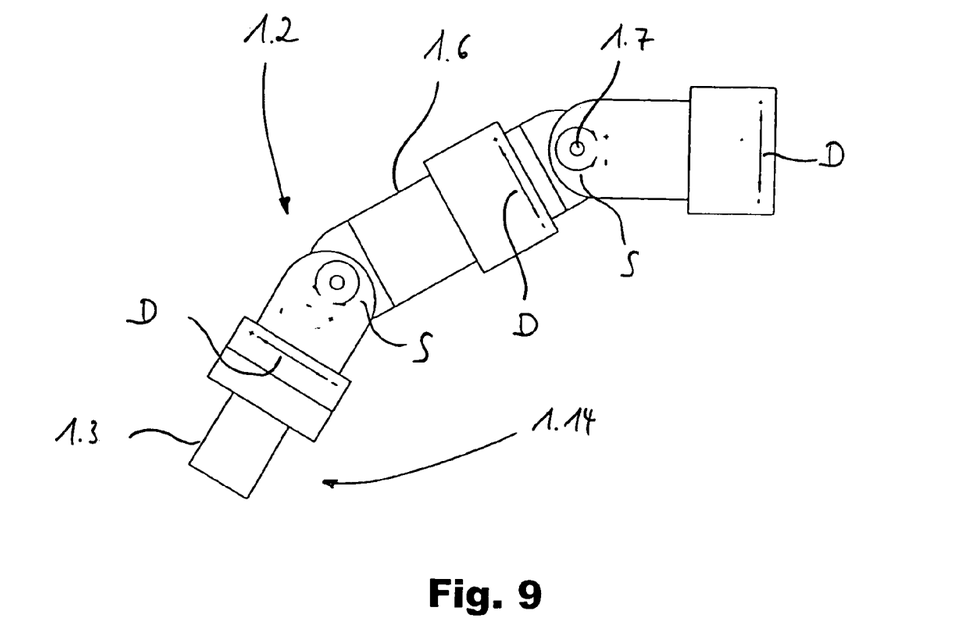
FIG. 9 A diagrammatic representation of an articulated arm for an inventive clamping robot.

FIG. 9 shows a corresponding view of an articulated arm 1.2, as used in developments of the inventive device 1 according to FIGS. 1a-d and 2a,b and 5.

Figure 10:
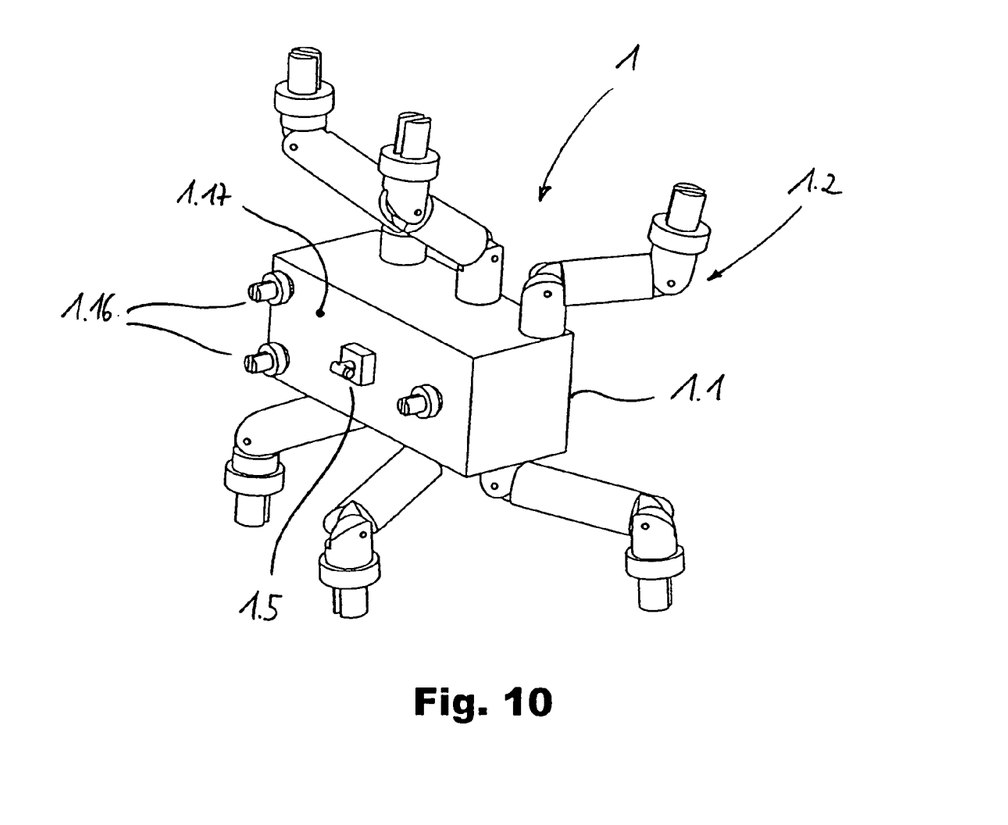
FIG. 10 A bottom view of an inventive clamping robot in articulated arm technology with support devices for direct placing on a body base.

FIG. 10 is a perspective view of an inventive clamping robot 1, where specific gripping devices 1.16 are located on the underside 1.17 of the central module 1.1. With the aid of the gripping devices 1.16, which can be constructed in the same way as the holding elements 1.3 in the form of couplings or magnets and which optionally have additional pins or studs (not shown), the inventive clamping robot 1 can be connected to the base 2.2 of the body shell 2 and supported and fixed independently of the clamping arms 1.2.

Figure 11:
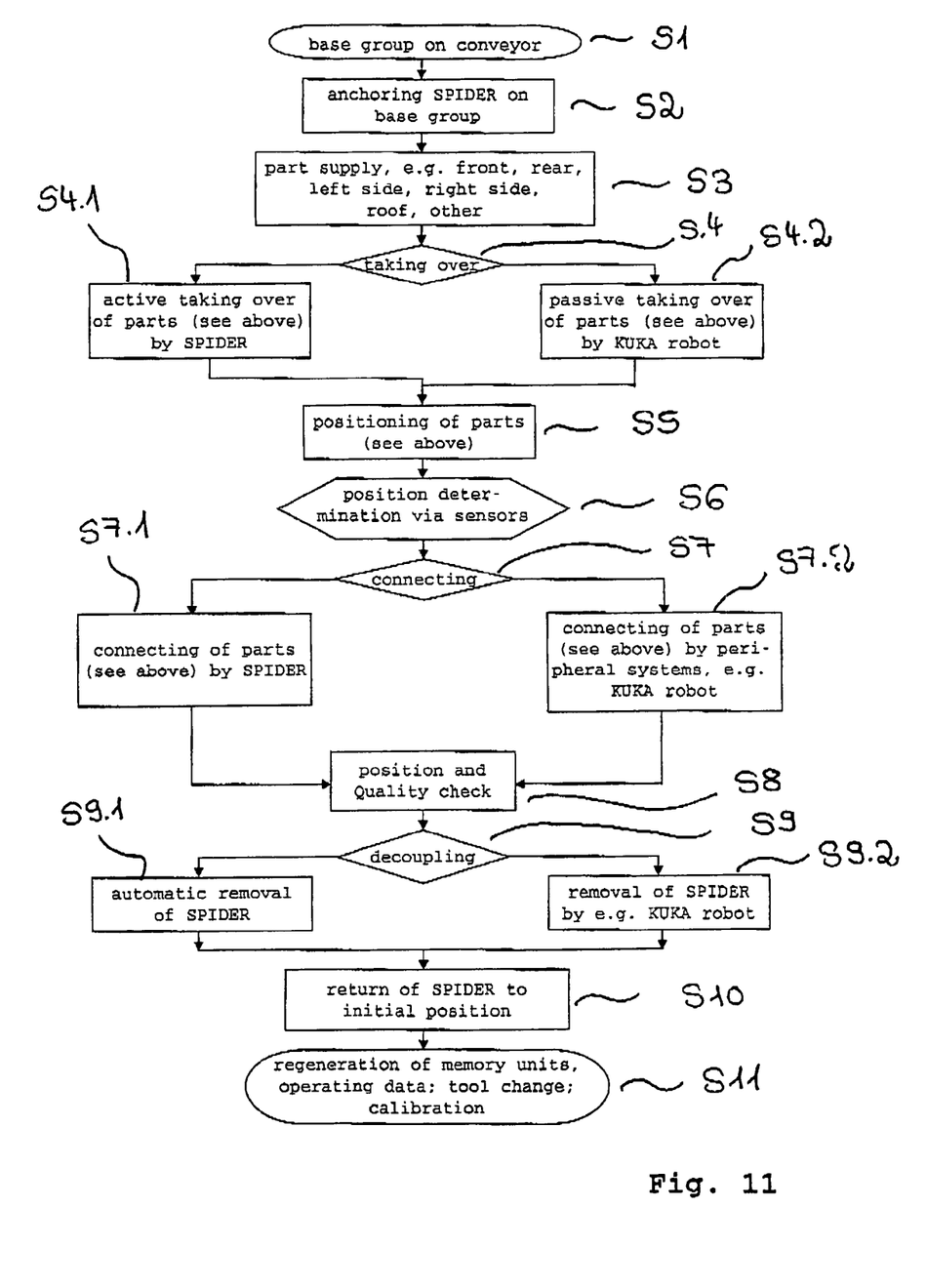
FIG. 11 A flow chart of an assembly process using the device according to the invention.

With the aid of a flow chart, FIG. 11 shows the actions taking place during an operating cycle, i.e. on assembling a body shell 2 using the clamping robot according to the invention. As a result of the spider-like appearance, the clamping robot 1 according to the invention shown in FIG. 11 is known as a spider.

In step S1 a base group of the vehicle body to be assembled is placed on a conveyor system, e.g. by means of the frame element 5 shown in FIGS. 4a, 4b. In step S2 the spider 1 is anchored on the base group 2.2 of the body 2, e.g. by the gripping devices 1.16 shown in FIG. 10. In the following step S3 further components 2.1, 2.3 are supplied and are taken over in step S4. The taking over in step S4 either takes place actively through the inventive clamping device 1 (step S4.1) or "passively" by an additional handling device, such as an industrial robot (step S4.2). In the following step S5 the components 2.1, 2.2, 2.3 are positioned (step S5) and then in step S6 there is preferably a position determination through the sensor system 1.5 or the further sensors contained in the arms 1.2 of the device 1.

As soon as the components to be joined together are correctly positioned, in step S7 the components are connected either (step S7.1) by the clamping device 1 according to the invention, provided that the latter carries suitable tools on its arms 1.2, or using external systems, such as industrial robots (step S7.2). Following connection, in step S8 a position and quality check (e.g. using sensor system 1.5) takes place.

Following the decoupling of the inventive clamping device 1 and the assembled body shell 2 in step S9, the inventive clamping device 1 is removed either automatically from the body 2 (step S9.1) or is removed therefrom by an external handling device (step S9.2). Then, in step S10, the clamping robot 1 is returned to its starting position, optionally associated with a regeneration of memory units and/or operating data, a tool change or a calibration in step S11. The clamping robot 1 according to the invention then waits in the starting position for the next group to be handled (step S1).

The invention claimed is:

1. A method for positioning automotive body parts to be joined together, the method comprising:
   positioning a multiaxially movable central module, said central module having at least three multiaxially movable articulated arms within an inner space defined by an automotive body part, said articulated arms being movable independent of the movement of said movable central module, each articulated arm being independently movable and having a holding means located at an end thereof;
   extending said articulated arms, in a position within said inner space, from a folded position to a clamping position, said holding means clamping said automotive body part in said clamping position such that said articulated arms support said automotive body part when another automotive body part is connected to said automotive body part to form an assembled automotive body part;
   folding said articulated arms into said folded position after said automotive body part is connected to said another automotive body part, one articulated arm being adjacent another articulated arm in said folded position, said articulated arms being in contact with said central module in said folded position;
   moving said central module with said articulated arms in said folded position to a location outside said assembled automotive body part after assembly of said automotive body parts.

2. The method according to claim 1, wherein the automotive body parts to be joined are at least roughly assembled by further suitable handling devices.

3. The method according to claim 1, wherein prior to a tacking together of the automotive body parts, position measurements are performed on the automotive body parts to be joined and if position deviations are established active position corrections are brought about by the articulated arms.

4. The method according to claim 3, wherein measured position values are buffer stored and after the detection of a deviation trends are used for the correction of a control program for the holding means and/or for messages to a quality assurance unit.

5. The method according to claim 3, wherein tacking together is carried out by the articulated arms using suitable tools.

6. The method according to claim 1, wherein following a subsequent tacking together of the automotive body parts or further downstream production processes, the articulated arms independently again move out of the space within the components.

7. The method according to claim 1, wherein, following a subsequent tacking together of the automotive body parts or further downstream production processes, the articulated arms are moved again out of the space within the automotive body parts by a further handling device.

8. The method according to claim 1, wherein the arms are positioned synchronously in space in accordance with a control unit.

9. The method according to claim 1, wherein the arms are positioned asynchronously in space in accordance with a control unit.

10. The method according to claim 1, wherein movements of the arms take place in at least three degrees of freedom in each case.

11. The method according to claim 1, wherein at least one articulated arm is directly supported on a base part of the automotive body parts.

12. The method according to claim 1, wherein the articulated arms are supported on a conveyor element carrying the automotive body parts.

13. A device for positioning automobile body parts to be joined together, the device comprising:
   a freely multiaxially movable central module; and
   three independently multiaxially movable articulated arms, said articulated arms being connected to said movable central module, said movable central module being movable from a location outside of an automobile body part to a position within an inner space of said automobile body part, at least one articulated arm having a holding element for holding the automobile body part, said articulated arms extending from a folded position to an extended position when said central module with said articulated arms is located within said inner space of said automobile body part, said articulated arms being adjacent to said movable central module in said folded position to form a compact positioning device, said articulated arms being extended in said extended position such that said holding element grips the automobile body part, whereby another automobile body part is connected to said automobile body part to form an assembled automobile body part, said articulated arms being folded into said folded position after said another automobile body part is connected to said automobile body part, whereby said central module with said articulated arms in said folded position moves to a location outside said assembled automobile body part after said another automobile body part is connected to said automobile body part.

14. The device according to claim 13, wherein the arms are constructed for movements with in each case at least three degrees of freedom.

15. The device according to claim 13, wherein a plurality of arms in each case has at least one tool for the connection of the assembled components.

16. The device according to claim 15, wherein the arms have means for media supply to the holding element and/or tools.

17. The device according to claim 13, wherein it can be brought into a space within a desired arrangement of the automotive body parts to be joined and following a subsequent tacking together of the automotive body parts or further downstream production processes can be removed again therefrom.

18. The device according to claim 13, wherein there is a computer-based control unit.

19. The device according to claim 13, wherein the central module has means for media supply to the arms.

20. The device according to claim 13, wherein the central module has a power supply unit.

21. The device according to claim 13, wherein the arms are constructed for the provision of high static holding forces up to 3000 N.

22. The device according to claim 13, wherein each arm has its own control-relevant point or terminal control position (TCP).

23. The device according to claim 13, wherein the movable central module and articulated arms connected to said movable central module are constructed for automatically moving into a space within the automotive body parts to be joined.

24. The device according to claim 13, wherein the movable central module and articulated arms connected to said movable central module are constructed for automatically moving out of the space within the automotive body parts to be joined.

25. The device according to claim 13, wherein the arms can be folded in and/or applied to the central module.

26. The device according to claim 13, wherein there is at least one support mechanism for supporting the articulated arms on a component of the assembled body part and/or a component-carrying conveyor element.

27. The device according to claim 26, wherein there is a storage unit for the buffer storage of measured values.

28. The device according to claim 13, wherein on the arms and/or central module are provided sensors for recording measured position values for the automotive body parts and/or further measured values relevant with respect to a quality assurance for downstream production processes.

29. A method for positioning a component within an inner space for joining to one or more additional components, the method comprising:

providing a central module for multiaxial movement;

providing at least three articulated arms attached to said central module for movement therewith and for movement independently of movement of said central module, at least one of said articulated arms having a holding means located at an end thereof;

moving said central module by multiaxial movement, with said articulated arms in a folded position, from a starting location outside of the inner space of the component to a work position within the inner space of the component, said articulated arms being adjacent to said movable central module in said folded position to form a compact positioning device;

extending one or more of said articulated arms within said inner space of the component from the folded position to a clamping position;

clamping the component with said holding means in said clamping position such that said articulated arms support the component when the component is connected to another component;

folding said articulated arms into said folded position after the component is connected to the other component to form an automobile body assembly;

moving said central module with said articulated arms in said folded position to a location outside said automobile body assembly after the component is connected to the other component.

* * * * *